United States Patent
Bostick et al.

(10) Patent No.: US 10,824,293 B2
(45) Date of Patent: Nov. 3, 2020

(54) FINGER DIRECTION BASED HOLOGRAPHIC OBJECT INTERACTION FROM A DISTANCE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/589,319

(22) Filed: May 8, 2017

(65) Prior Publication Data

US 2018/0321816 A1 Nov. 8, 2018

(51) Int. Cl.
*G06F 3/0481* (2013.01)
*G03H 1/00* (2006.01)
(Continued)

(52) U.S. Cl.
CPC ....... *G06F 3/04815* (2013.01); *G03H 1/0005* (2013.01); *G06F 3/011* (2013.01);
(Continued)

(58) Field of Classification Search
CPC .......... G03H 1/0005; G03H 2001/0061; G06F 3/017; G06F 3/033; G06F 3/048–04897;
(Continued)

(56) References Cited

U.S. PATENT DOCUMENTS

| 4,899,136 A | * | 2/1990 | Beard | G06F 3/0481 |
| | | | | 345/156 |
| 4,937,036 A | * | 6/1990 | Beard | G06F 3/0481 |
| | | | | 345/156 |

(Continued)

FOREIGN PATENT DOCUMENTS

| CN | 204117555 U | 1/2015 |
| EP | 3002944 A1 | 4/2016 |

OTHER PUBLICATIONS

Edelman et al., "Face2Face—A system for multi-touch collaboration with telepresence," Feb. 16, 2012, 2012 IEEE International Conference on Emerging Signal Processing Applications (pp. 159-162) (Year: 2012).*

(Continued)

*Primary Examiner* — Kieu D Vu
*Assistant Examiner* — Alvaro R Calderon, IV
(74) *Attorney, Agent, or Firm* — Brown & Michaels, PC; Jay Wahlquist

(57) ABSTRACT

Selecting a user to control a 3D holographic object of a plurality of 3D holographic objects projected in midair above a central point of a location by a projector when multiple users attempt to manipulate the same 3D holographic objects. Identification of the users and a policy regarding manipulation of the 3D holographic objects selected by more than one user are evaluated. For each of the 3D holographic objects selected by multiple users, a queue of interactions requested by the multiple users is generated during interactions of a single user with the 3D holographic object; and the interactions requested by the user with a highest priority of the multiple users are executed to manipulate the selected 3D holographic object.

11 Claims, 5 Drawing Sheets

(51) Int. Cl.
*G06F 3/01* (2006.01)
*G06F 3/0484* (2013.01)
*G06K 9/00* (2006.01)

(52) U.S. Cl.
CPC .......... *G06F 3/017* (2013.01); *G06F 3/04842* (2013.01); *G06F 3/04845* (2013.01); *G06K 9/00375* (2013.01); *G03H 2001/0061* (2013.01)

(58) Field of Classification Search
CPC .......... G06F 2203/048–04809; G06F 3/04842; G06F 17/30061; G06K 9/00288; G06K 9/00671; G06T 17/00; G06T 2200/24; G06T 19/20; G06T 13/80; G06T 15/00–02; G11B 19/025; G11B 27/34; G06Q 10/101; G06Q 10/10; G06Q 10/063114; H04L 29/06421; H04L 12/813; H04L 29/08684; H04L 12/5815; H04N 7/157; H04N 7/16; H04N 1/00477; H04N 21/4312; H04M 3/567; A63F 2300/8082; A63F 2300/5553; G06N 3/006

See application file for complete search history.

(56) References Cited

U.S. PATENT DOCUMENTS

| | | | | |
|---|---|---|---|---|
| 4,939,507 | A * | 7/1990 | Beard | G06F 3/0481 345/156 |
| 5,113,517 | A * | 5/1992 | Beard | G06F 9/451 703/23 |
| 6,031,519 | A | 2/2000 | O'Brien | |
| 6,243,054 | B1 * | 6/2001 | DeLuca | G02B 27/22 345/7 |
| 6,393,117 | B1 * | 5/2002 | Trell | H04M 3/42008 379/207.03 |
| 6,559,813 | B1 * | 5/2003 | DeLuca | G02B 27/22 345/8 |
| 6,788,809 | B1 * | 9/2004 | Grzeszczuk | G06F 3/017 345/419 |
| 8,233,206 | B2 | 7/2012 | Kramer et al. | |
| 8,601,386 | B2 * | 12/2013 | Altberg | H04L 12/66 715/706 |
| 8,701,050 | B1 * | 4/2014 | Starner | G06F 3/04895 715/773 |
| 8,831,994 | B1 * | 9/2014 | Hoffman | G06F 21/6218 705/50 |
| 8,964,298 | B2 * | 2/2015 | Haddick | G06F 3/013 359/630 |
| 9,298,283 | B1 * | 3/2016 | Lin | G06F 3/0346 |
| 9,400,575 | B1 * | 7/2016 | Karakotsios | G06F 3/0425 |
| 9,477,380 | B2 * | 10/2016 | Amijee | G06F 16/4393 |
| 9,886,788 | B2 * | 2/2018 | Hugel | A63F 13/10 |
| 9,942,519 | B1 * | 4/2018 | Pan | H04L 65/1093 |
| 2003/0093167 | A1 * | 5/2003 | Sim | G06Q 10/02 700/90 |
| 2003/0117397 | A1 * | 6/2003 | Hubrecht | G06T 17/00 345/420 |
| 2003/0142068 | A1 * | 7/2003 | DeLuca | G02B 27/22 345/156 |
| 2004/0128012 | A1 * | 7/2004 | Lin | G06F 3/011 700/100 |
| 2005/0264527 | A1 * | 12/2005 | Lin | G06F 3/011 345/156 |
| 2006/0107229 | A1 * | 5/2006 | Matthews | G06F 3/0481 715/782 |
| 2007/0014284 | A1 * | 1/2007 | Daniels | H04L 51/04 370/389 |
| 2008/0170748 | A1 * | 7/2008 | Albertson | G06F 3/017 382/103 |
| 2008/0262910 | A1 * | 10/2008 | Altberg | G06Q 30/02 705/14.69 |
| 2008/0262911 | A1 * | 10/2008 | Altberg | G06Q 30/02 705/14.73 |
| 2008/0263446 | A1 * | 10/2008 | Altberg | G06Q 30/02 715/706 |
| 2008/0263459 | A1 * | 10/2008 | Altberg | G06Q 50/00 715/757 |
| 2008/0263460 | A1 * | 10/2008 | Altberg | G06Q 30/02 715/757 |
| 2011/0055135 | A1 * | 3/2011 | Dawson | G06Q 30/02 706/47 |
| 2011/0126272 | A1 * | 5/2011 | Betzler | G06F 21/41 726/6 |
| 2011/0185293 | A1 * | 7/2011 | Barnett | H04M 3/5175 715/760 |
| 2011/0248958 | A1 | 10/2011 | Gruhlke et al. | |
| 2012/0096365 | A1 * | 4/2012 | Wilkinson | G06F 9/468 715/740 |
| 2012/0127102 | A1 * | 5/2012 | Uenohara | G06F 3/0486 345/173 |
| 2013/0051547 | A1 * | 2/2013 | Chavez | G06Q 10/101 379/265.09 |
| 2013/0083062 | A1 * | 4/2013 | Geisner | G02B 27/017 345/633 |
| 2013/0097490 | A1 * | 4/2013 | Kotler | G06F 40/10 715/255 |
| 2013/0278631 | A1 * | 10/2013 | Border | G02B 27/017 345/633 |
| 2013/0307774 | A1 * | 11/2013 | Hayashi | G06F 3/017 345/158 |
| 2013/0318533 | A1 * | 11/2013 | Aghassipour | G06F 9/4881 718/103 |
| 2013/0326430 | A1 * | 12/2013 | Devi | G06F 3/0488 715/863 |
| 2013/0342459 | A1 * | 12/2013 | Karakotsios | G06F 3/0418 345/159 |
| 2014/0201689 | A1 * | 7/2014 | Bedikian | G06F 3/011 715/863 |
| 2014/0253432 | A1 * | 9/2014 | Ferguson | G06F 3/0304 345/156 |
| 2014/0267598 | A1 * | 9/2014 | Drouin | G03H 1/0005 348/40 |
| 2014/0267599 | A1 * | 9/2014 | Drouin | G03H 1/2294 348/41 |
| 2014/0306891 | A1 | 10/2014 | Latta et al. | |
| 2015/0089399 | A1 * | 3/2015 | Megill | H04L 12/1813 715/753 |
| 2015/0089634 | A1 * | 3/2015 | DeLuca | G06F 3/0488 726/19 |
| 2015/0169176 | A1 * | 6/2015 | Cohen | G06F 3/04815 715/852 |
| 2015/0301729 | A1 * | 10/2015 | Wang | G06F 3/0485 715/707 |
| 2016/0026253 | A1 * | 1/2016 | Bradski | G02B 27/225 345/8 |
| 2016/0049013 | A1 * | 2/2016 | Tosas Bautista | G06T 19/006 345/633 |
| 2016/0057511 | A1 * | 2/2016 | Mullins | G08C 17/00 340/870.07 |
| 2016/0350136 | A1 * | 12/2016 | Karlo | G06F 3/04842 |
| 2017/0140144 | A1 * | 5/2017 | Bock | G06T 7/74 |
| 2018/0053282 | A1 * | 2/2018 | Engler | G06K 9/00221 |
| 2018/0174103 | A1 * | 6/2018 | Auger | G06F 3/04817 |
| 2018/0276247 | A1 * | 9/2018 | Goyal | G06F 3/017 |
| 2018/0308287 | A1 * | 10/2018 | Daniels | G06F 3/04842 |
| 2018/0309808 | A1 * | 10/2018 | Andon | H04L 65/4053 |
| 2019/0114061 | A1 * | 4/2019 | Daniels | G06F 3/04815 |

OTHER PUBLICATIONS

Plesniak et al., "Haptic Holography: A Primitive Computational Plastic," Sep. 8, 2003, Proceedings of the IEEE (vol. 91, Issue: 9, pp. 1443-1456) (Year: 2003).*

Mahfud et al., "Interactive aerial projection of 3D hologram object," Mar. 2, 2017, 2016 IEEE International Conference on Robotics and Biomimetics (ROBIO) (pp. 1930-1935) (Year: 2016).*

(56) References Cited

OTHER PUBLICATIONS

Dudley, "Holography," Apr. 17, 1974, https://web.archive.org/web/20150217175104/https://ntrs.nasa.gov/archive/nasa/casi.ntrs.nasa.gov/19740012004.pdf (Year: 1974).*

Andujar et al., "A Cost-effective Approach for Developing Application-control GUIs for Virtual Environments," Mar. 26, 2006, http://ieeexplore.ieee.org/stamp/stamp.jsp?tp=&arnumber=1647505&isnumber=34551 (Year: 2006).*

Lin et al., "Ubii: Physical World Interaction Through Augmented Reality," Mar. 1, 2017, IEEE Transactions on Mobile Computing, vol. 16, No. 3, pp. 872-885 (Year: 2017).*

Malik et al., "Visual Touchpad: A Two-handed Gestural Input Device," In Proceedings of the 6th international conference on Multimodal interfaces (ICMI '04). ACM, New York, NY, USA, 289-296. Oct. 2004. DOI: http://dx.doi.org/10.1145/1027933.1027980 (Year: 2004).*

Von Hardenberg et al., "Bare-Hand Human-Computer Interaction," Nov. 16, 2001, In Proceedings of the 2001 workshop on Perceptive user interfaces (PUI '01). ACM, New York, NY, USA, 1-8. DOI: https://doi.org/10.1145/971478.971513 (Year: 2001).*

Segen et al., "Gesture VR: Vision-Based 3D Hand InterFace for Spatial Interaction," Sep. 16, 1998, In Proceedings of the sixth ACM international conference on Multimedia (MULTIMEDIA '98). ACM, New York, NY, USA, 455-464. DOI=http://dx.doi.org/10.1145/290747.290822 (Year: 1998).*

Wu et al., "Multi-Finger and Whole Hand Gestural Interaction Techniques for Multi-User Tabletop Displays," Nov. 5, 2003, In Proceedings of the 16th annual ACM symposium on User interface software and technology (UIST '03). ACM, New York, NY, USA, 193-202. DOI: https://doi.org/10.1145/964696.964718 (Year: 2003).*

Dietz et al., "DiamondTouch: A Multi-User Touch Technology," Nov. 14, 2001, In Proceedings of the 14th annual ACM symposium on User interface software and technology (UIST '01). ACM, New York, NY, USA, 219-226. DOI=http://dx.doi.org/10.1145/502348.502389 (Year: 2001).*

Ringel Morris et al., "Beyond "Social Protocols": Multi-User Coordination Policies for Co-located Groupware," Nov. 10, 2004, In Proceedings of the 2004 ACM conference on Computer supported cooperative work (CSCW '04). ACM, New York, NY, USA, 262-265. DOI=http://dx.doi.org/10.1145/1031607.1031648 (Year: 2004).*

"Method and System for Holographic Object Interaction Based on Environmental Parameters", An IP.com Prior Art Database Technical Disclosure; IP.com No. IPCOM000246748D; Jun. 2016.

Liu et al. "Predefined Target Oriented Gesture Control", An IP.com Prior Art Database Technical Disclosure; IP.com No. IPCOM000243689D; Oct. 2015.

"Optimizing Target Hit rate in Touch interaction using library of virtual (wearable) finger tips"; An IP.com Prior Art Database Technical Disclosure; IP.com No. IPCOM000223869D; Dec. 2012.

Siemens et al. "Hand Gesture Recognition"; An IP.com Prior Art Database Technical Disclosure; IP.com No. IPCOM000169208D; Apr. 2008.

Cervantes, E. "Samsung files patent for smartphone that can display holographic images", retrieved from http://www.androidauthority.com/samsung-patent-smartphone-holographic-images-633167/; Aug. 2015.

"Apple Granted a Killer Interactive Holographic Display Patent for Future Macs and iDevices"; retrieved from http://www.patentlyapple.com/patently-apple/2014/09/apple-granted-a-killer-interactive-holographic-display-patent-for-future-macs-and-idevices.html; Sep. 2014.

* cited by examiner

FINGER DIRECTION BASED HOLOGRAPHIC OBJECT INTERACTION FROM A DISTANCE

BACKGROUND

The present invention relates to holographic object interaction, and more specifically to finger direction based holographic object interaction from a distance.

Holographic three-dimension (3D) objects can be projected in mid-air. Users can interact with the holographic objects with finger touch and/or various gestures.

Currently holographic images are controlled in midair using eye tracking and finger pointing to determine coordination of an object for selection.

SUMMARY

According to one embodiment of the present invention, a method of selecting a user to control a 3D holographic object of a plurality of 3D holographic objects projected in midair above a central point of a location by a projector is disclosed. The location further comprising a plurality of cameras around the central point of the location. The method comprising the steps of: a computer identifying users situated around the central point and the 3D holographic objects; the computer identifying a plurality of user interactions with the 3D holographic objects; the computer evaluating identification of the users and a policy regarding manipulation of the 3D holographic objects selected by more than one user; the computer, for the 3D holographic objects selected by multiple users, generating a queue of interactions requested by the multiple users during interactions of a single user with the 3D holographic object; and the computer executing the interactions requested by the user with a highest priority of the multiple users.

According to another embodiment of the present invention, a computer program product for selecting a user to control a 3D holographic object of a plurality of 3D holographic objects projected in midair above a central point of a location by a projector is disclosed. The location further comprising a plurality of cameras around the central point of the location and a computer within the location and in communication with the projector comprising at least one processor, one or more memories, one or more computer readable storage media. The computer program product comprising a computer readable storage medium having program instructions embodied therewith, the program instructions executable by the computer to perform a method comprising: identifying, by the computer, users situated around the central point and the 3D holographic objects; identifying, by the computer, a plurality of user interactions with the 3D holographic objects; evaluating, by the computer, identification of the users and a policy regarding manipulation of the 3D holographic objects selected by more than one user; for the 3D holographic objects selected by multiple users, generating, by the computer, a queue of interactions requested by the multiple users during interactions of a single user with the 3D holographic object; and executing, by the computer, the interactions requested by the user with a highest priority of the multiple users.

According to another embodiment of the present invention, a computer system for selecting a user to control a 3D holographic object of a plurality of 3D holographic objects projected in midair above a central point of a location by a projector is disclosed. The location further comprising a plurality of cameras around the central point of the location, and a computer within the location and in communication with the projector comprising at least one processor, one or more memories, one or more computer readable storage media having program instructions executable by the computer to perform the program instructions. The program instructions comprising: identifying, by the computer, users situated around the central point and the 3D holographic objects; identifying, by the computer, a plurality of user interactions with the 3D holographic objects; evaluating, by the computer, identification of the users and a policy regarding manipulation of the 3D holographic objects selected by more than one user; for the 3D holographic objects selected by multiple users, generating, by the computer, a queue of interactions requested by the multiple users during interactions of a single user with the 3D holographic object; and executing, by the computer, the interactions requested by the user with a highest priority of the multiple users.

DETAILED DESCRIPTION

Figure 1:
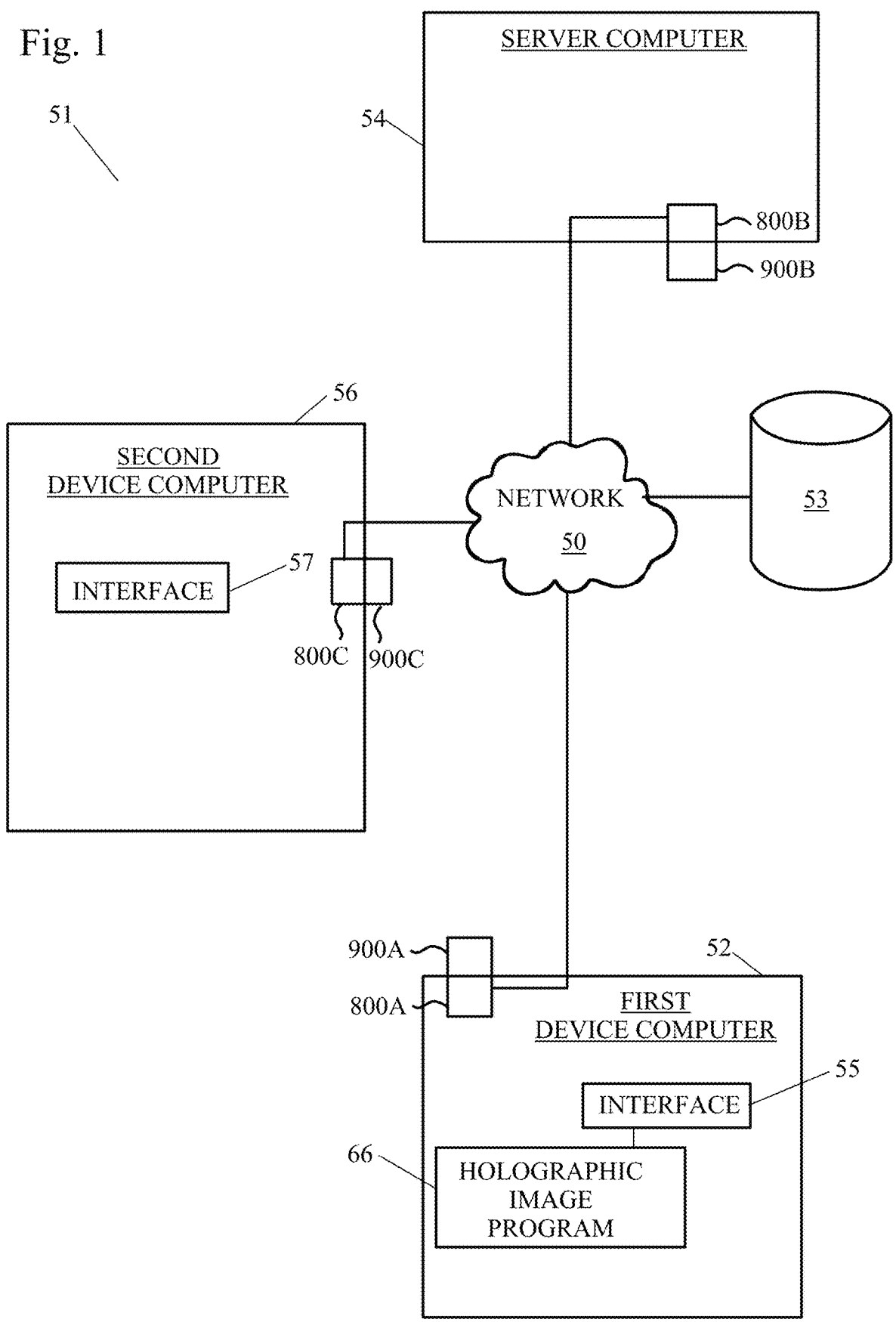
FIG. 1 depicts an exemplary diagram of a possible data processing environment in which illustrative embodiments may be implemented.

In an embodiment of the present invention, a method for multiple users in a holographic system to interact and manipulate 3D holographic objects remotely, simultaneously or separately with a defined priority and duration is disclosed. The holographic system includes cameras and sensors used to capture interaction behavior of participating users from various angles to identify if a user is using a finger gesture to control and interact (i.e. selection, touch, rotate, move or change direction, etc.) with holographic objects. Using image analysis techniques, the holographic system extrapolates a finger direction of the user to identify the holographic objects intended to be selected. Accordingly the holographic projection system plots a holographic intersection line from the fingertip to the holographic object of a defined color of the user to signal the selection. Once the object is selected, other gestures are mapped to manipulate the object. The cameras of the ecosystem capture images of the users to identify the user from facial recognition such that a priority hierarchy and queuing system is established for cases of more than one user attempting to manipulate the 3D holographic object at a time when a specific object type or operation type (move object) can only have one user at a time manipulate the object. Each user may also be granted specific actions and duration for manipulation of the object. Once the user has finished interaction with the object, the other users in the queue will be notified with a holographic line towards the user. Accordingly other users can take the control of the holographic object navigation and interaction.

In an embodiment of the present invention, a method of determining a user which can interact (i.e. select, touch, rotate, move or change direction, etc.) with the holographic objects, determines duration of interaction, and provides a mechanism to queue and notify other users. The holographic system uses cameras to capture images of the users to determine and identify the user from facial recognition, such that a priority hierarchy and queuing system is established for cases of more than one user attempting to manipulate the 3D holographic object at a time when a specific object type or operation type (i.e., move object) can only have one user at a time manipulate the object. Each user may also be granted specific actions and duration for manipulation of the object. Once the user has finished interaction with the object, the other users in the queue will be notified with a holographic line towards the user. Accordingly other users can take control of the holographic object navigation and interaction. The requests will be evaluated based on the object policy and user priority for a given object and operation.

In an embodiment of the present invention, the system can allow for multi-user control, such that when more than one user is present within a given space and attempting to interact with a 3D holographic object, a user can control the 3D holographic object and the system can queue actions of other users not currently interacting with the hologram or 3D holographic object and provide priority to some of the users for interaction with the 3D holographic object. For example, if a manager or executive seeks to manipulate a hologram, that user may be given priority over other users based on their identity.

The system of the present invention also allows for manipulation of 3D holographic objects remotely such as a user seeking to manipulate a 3D holographic object which is beyond arm's length to virtually touch the projected 3D holographic object. For example, 3D holographic objects are created at a large table, and various users are sitting around the table. It may not be possible for them to manually touch and control the holographic object directly. The users control the holographic objects for activities such as an interactive business meeting, multi-player gaming, etc. remotely or from a distance.

It will be recognized that multiple users in the hologram ecosystem of the present invention have the ability to interact with projected holographic images in priority evaluated order, and being able to visualize the interaction remotely from the user to the object.

Figure 3:
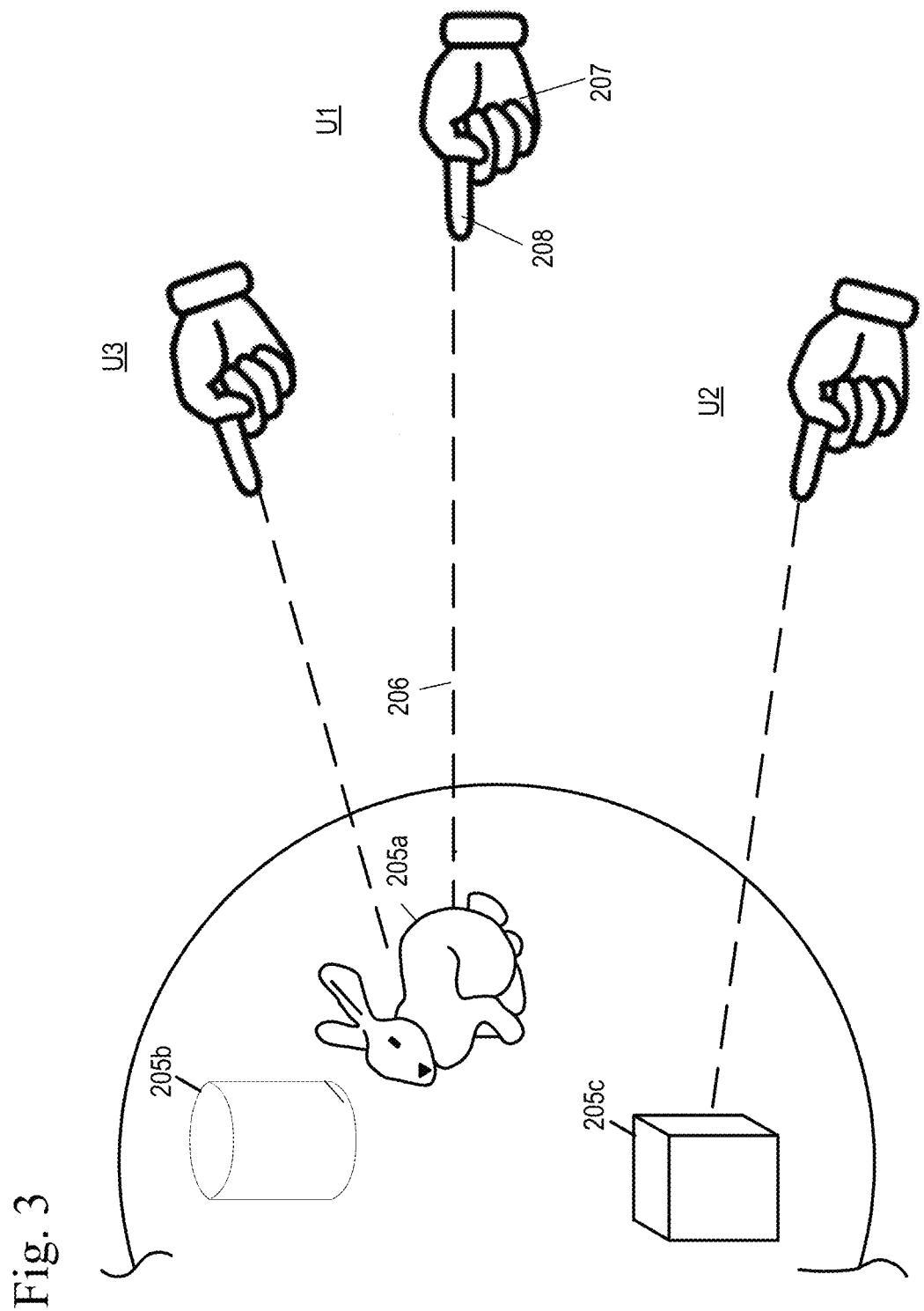
FIG. 3 shows a holographic system with user remote object interaction.

FIG. 3 shows a holographic system with user remote object interaction. The environment 100 is a location in which the holographic object is to be manipulated in. The location may be conference room, meeting room or other physical location.

Within the environment 100 is a projector 102 which projects at least one 3D holographic object 205a-205c midair from the table or surface 104. Also present within the environment 100 is a plurality of cameras 103a-103n. The cameras 103a-103n observe and capture images of the users U1-UN for input for facial recognition and identification of object type from multiple angles. It should be noted that the placement of the cameras 103a-103n and the projector 102 may be present within the environment in locations other than what is shown in FIG. 3.

A computer, such as first device computer 52 as shown in FIG. 1 may also be present within the environment to define hologram properties, to define user control policy, to allow the user to initiate interaction with the 3D hologram object, to evaluate the priority of the user and object policy for queuing of interaction request, interaction and manipulation of the 3D hologram object, and for processing queued interaction requests. The projector 102 and the plurality of cameras 103a-103n can each contain a second device computer 56 as shown in FIG. 1. Alternatively, the projector 102 and the plurality of cameras 103a-103n can each contain a first device computer 52. The plurality of cameras 103a-103n, the projector 102 and the first device computer 52 may be connected through a network 50. Furthermore, a server computer 54 may be present within the network 50. The first device computer 52, second device computer 56 and server computer 54 may access a repository 53 through a network 50. The repository 53 may contain control policy of 3D holographic objects, user profiles, user hierarchy or priority for manipulation of 3D holographic objects.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first device computer 52, a second device computer 56, a repository 53, and a server computer 54 connect to network 50. In other exemplary embodiments, network data processing system 51 may include additional client or device computers, storage devices or repositories, server computers, and other devices not shown.

The first device computer 52 may contain an interface 55, which may accept commands and data entry from a user. The commands may be regarding hologram properties, policy and priority of users regarding manipulation of a 3D holographic object. The interface can be, for example, a command line interface, a graphical user interface (GUI), a natural user interface (NUI) a touch user interface (TUI), a web based interface, or an application programming interface for defining the hologram interaction policies and user control polices. The first device computer 52 preferably includes holographic image program 66. While not shown, it may be desirable to have the holographic image program 66 be present on the server computer 54 or the second device computer 56. The first device computer 52 includes a set of internal components 800a and a set of external components 900a, further illustrated in FIG. 2.

The second device computer 52 may contain an interface 57, which may accept commands and data entry from a user. The commands may be regarding projection and/or manipulation of a 3D holographic object or holographic image projection. The interface can be, for example, a command line interface, a graphical user interface (GUI), a natural user interface (NUI) or a touch user interface (TUI). The second device computer 52 includes a set of internal components 800b and a set of external components 900b, further illustrated in FIG. 2.

Figure 2:
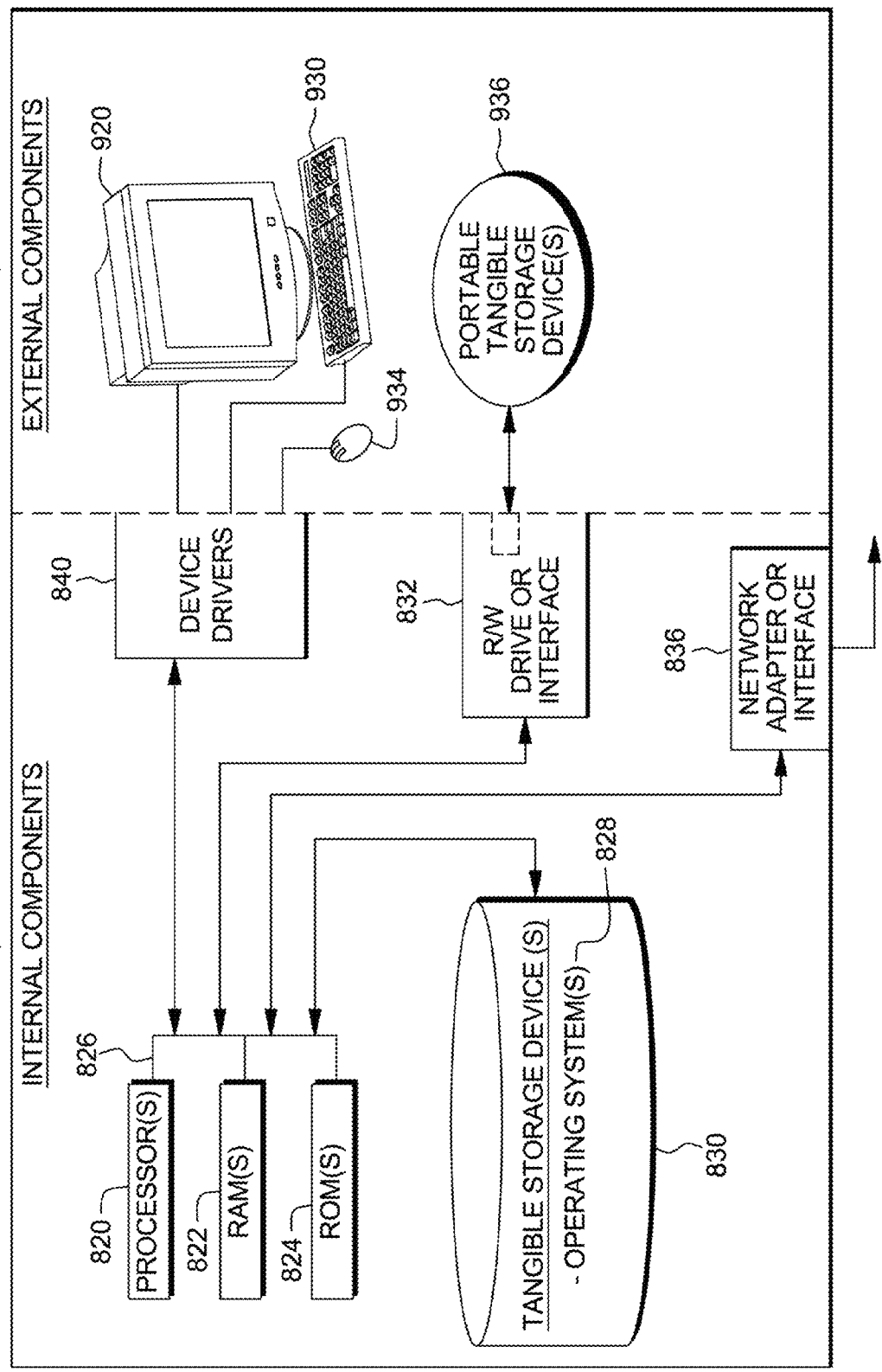
FIG. 2 illustrates internal and external components of a client computer and a server computer in which illustrative embodiments may be implemented.

Server computer 54 includes a set of internal components 800c and a set of external components 900c illustrated in FIG. 2. In the depicted example, server computer 54 provides information, such as boot files, operating system images, and applications to the first device computer 52 and/or the second device computer 56. Server computer 54 can compute the information locally or extract the information from other computers on network 50. The server computer 54 may contain the holographic image program 66.

Program code and programs such as holographic image program 66 may be stored on at least one of one or more computer-readable tangible storage devices 830 shown in FIG. 2, on at least one of one or more portable computer-readable tangible storage devices 936 as shown in FIG. 2, or on storage unit 53 connected to network 50, or may be downloaded to a first device computer 52, a second device computer 56 or server computer 54, for use. For example, program code and programs such as holographic image program 66 may be stored on at least one of one or more storage devices 830 on server computer 54 and downloaded to the first device computer 52 or the second device computer 56 over network 50 for use. Alternatively, server computer 54 can be a web server, and the program code, and programs such as holographic image program 66, may be stored on at least one of the one or more storage devices 830 on server computer 54 and accessed by the first device computer 52 and/or the second device computer 56. In other exemplary embodiments, the program code, and programs such as holographic image program 66 may be stored on at least one of one or more computer-readable storage devices 830 on a first device computer 52, a second device computer 56 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of a first device computer 52, a second device computer 56, and a server computer 54 in which illustrative embodiments may be implemented. In FIG. 2, a first device computer 52, a second device computer 56 and a server computer 54 include respective sets of internal components 800*a*, 800*b*, 800*c* and external components 900*a*, 900*b*, 900*c*. Each of the sets of internal components 800*a*, 800*b*, 800*c* includes one or more processors 820, one or more computer-readable RAMs 822 and one or more computer-readable ROMs 824 on one or more buses 826, and one or more operating systems 828 and one or more computer readable tangible storage devices 830. The one or more operating systems 828 and holographic image program 66 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b*, 800*c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Holographic image program 66 can be stored on one or more of the portable computer-readable tangible storage devices 936, read via R/W drive or interface 832 and loaded into hard drive 830.

Each set of internal components 800*a*, 800*b*, 800*c* also includes a network adapter or interface 836 such as a TCP/IP adapter card. Holographic image program 66 can be downloaded to the first device computer 52, the second device computer 56 and server computer 54 from an external computer via a network (for example, the Internet, a local area network or other, wide area network) and network adapter or interface 836. From the network adapter or interface 836, holographic image program 66 is loaded into hard drive 830. Holographic image program 66 can be downloaded to the server computer 54 from an external computer via a network (for example, the Internet, a local area network or other, wide area network) and network adapter or interface 836. From the network adapter or interface 836, holographic image program 66 is loaded into hard drive 830. The network may comprise copper wires, optical fibers, wireless transmission, routers, firewalls, switches, gateway computers and/or edge servers.

Each of the sets of external components 900*a*, 900*b*, 900*c* includes a computer display monitor 920, a keyboard 930, and a computer mouse 934. Each of the sets of internal components 800*a*, 800*b*, 800*c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Holographic image program 66 can be written in various programming languages including low-level, high-level, object-oriented or non object-oriented languages. Alternatively, the functions of a holographic image program 66 can be implemented in whole or in part by computer circuits and other hardware (not shown).

Figure 4:
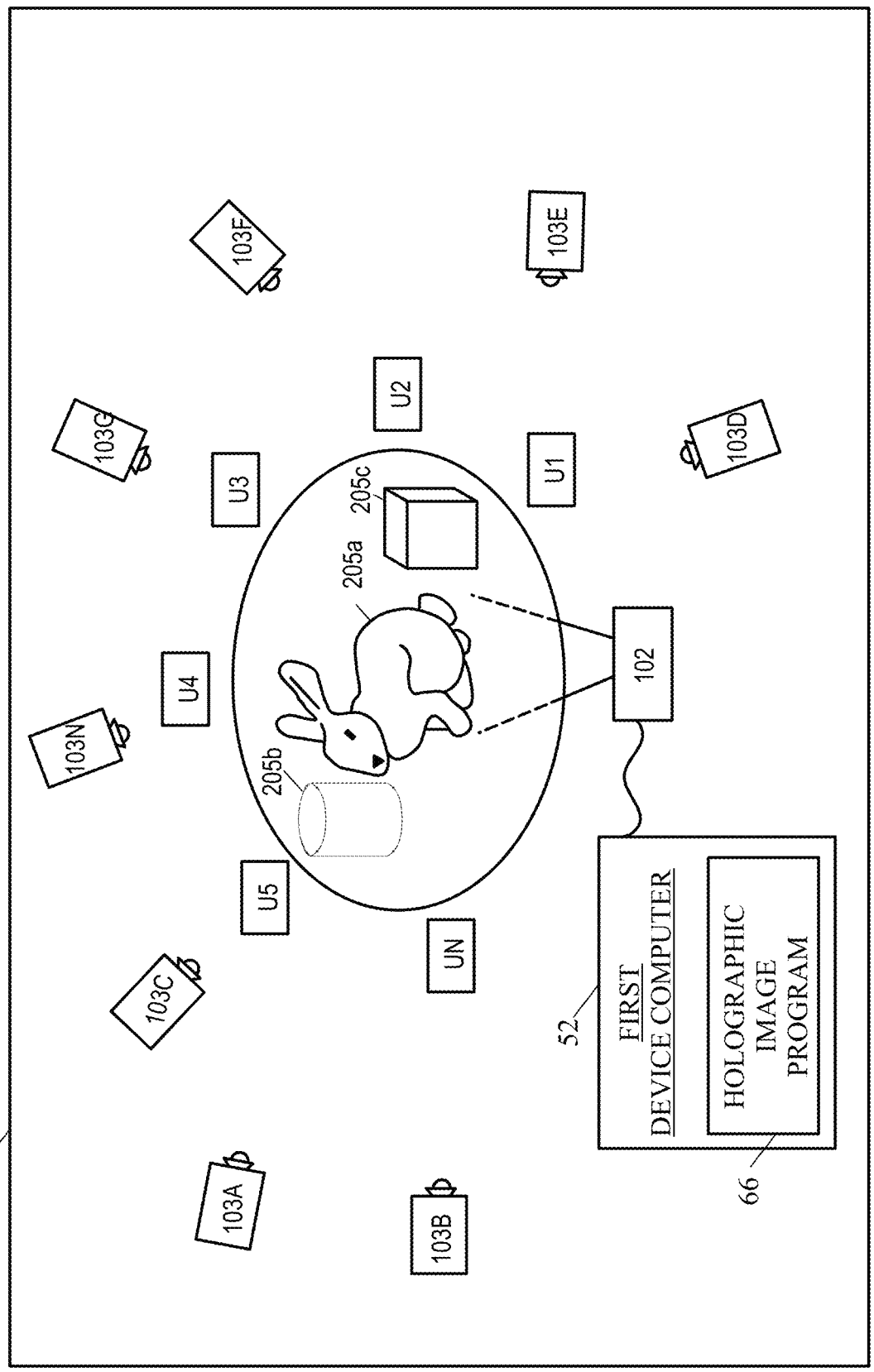
FIG. 4 depicts a holographic projector environment.

FIG. 4 depicts a holographic projector ecosystem, where at least one holographic projector 102 and a plurality of cameras 103*a*-103*n* are installed in the surrounding ecosystem to plot the holographic objects being projected by a projector 102 relative to the users U1-UN within the ecosystem 100. Cameras 103*a*-103*n* installed in the environment identify users using their finger with the intention of controlling the 3D holographic object 205*a*-205*c*. The ecosystem, via the first device computer 52 and cameras 103*a*-103*n*, identifies an extrapolated finger 208 (as shown in FIG. 3) direction of a hand 207 of the user and if the finger direction of the user intersects with any 3D holographic objects 205*a*-205*c*. The first device computer 52 plots a holographic line 206 (dashed line) from the user's fingertip 208 to the 3D holographic object 205*a*-205*c*. Other sensors may also be used to extrapolate finger direction within the ecosystem 100. When a user is controlling the 3D holographic object, the object or portion of the object may be a color assigned to the user. Referring to FIG. 3, the extrapolated finger direction would identify both user U1 and U3 as intersecting with the 3D holographic object 205*a* in the shape of a bunny and extrapolated finger direction of user U2 as intersecting with the 3D holographic object 205*c* of a cube.

Prior to a user controlling a 3D holographic object, a hologram interaction policy may be determined. The hologram interaction policy includes a definition of the shape of the 3D holographic object (i.e. square, rectangular, bunny, etc.); definition of controls on each side of object that users can interact (i.e., touch interface with areas or buttons); definition of the number of users that can interact with the object simultaneously; definition of operations that only one user can perform at time (i.e., rotation or movement of the object); and definition of a duration of time for specific operation.

A user control policy mapping is also determined. The user control policy defines user hierarchy for control of objects. For example, priority manager=1, team lead=2, other member queue on first come basis. Users will be queued until operation is complete or duration of time has expired. Each user has a defined color mapping such that when they select or manipulate an object, the line from the user to the object is represented as active by showing the color for that user. The line could be configured to pulse or stay solid.

Figure 5:
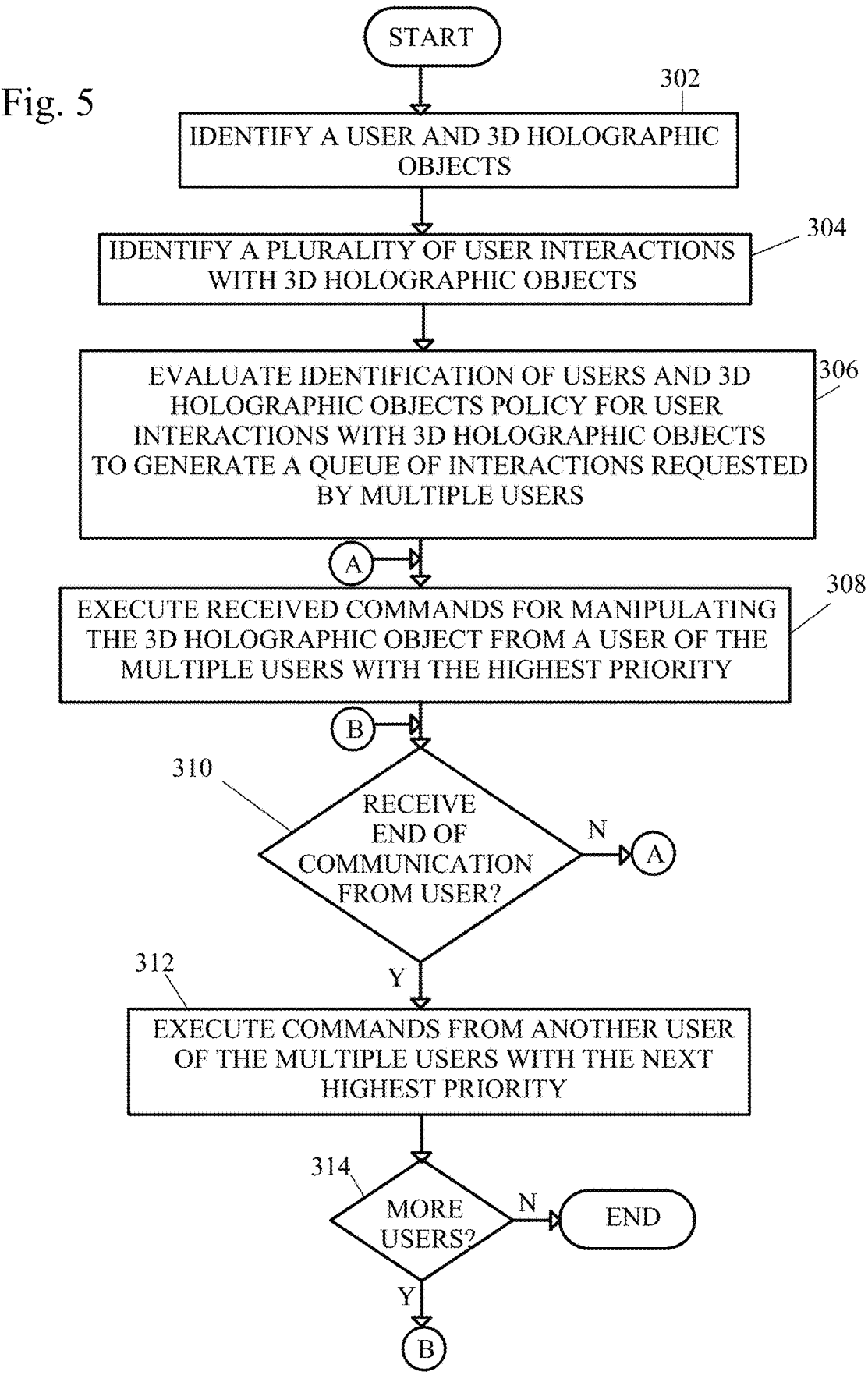
FIG. 5 shows a flow diagram of a method of user identification and priority manipulation of 3D holographic objects.

FIG. 5 shows a flow diagram of a method of user identification and priority manipulation of 3D holographic objects with an ecosystem.

In a first step, a computer, for example the first device computer 52 of the ecosystem, identifies a user and a holographic 3D holographic object (step 302).

The users which can control or request control of the 3D holographic object may or may not already have a profile with data regarding facial recognition of the user accessible by the first device computer 52. If a user requesting control of a 3D holographic object does not have a profile or a profile with data regarding facial recognition of the user, the first device computer uses a cognitive system with image analytics to capture images of the user's face, for example through cameras 103a-103n to identify the user through facial recognition. To identify the users, the users need to be gathered around a central point, such as a conference room table. Cameras 103a-103n in the environment capture an image of the users and the 3D holographic object.

A deep learning system is a cognitive technique which can be used to identify a user. The deep learning system understands a picture's content and context and can determine factors such as who is in frame, gender and age, and can incorporate high level tags regarding the surroundings of the user. Visual Recognition is another cognitive technique which can be used to identify a user. Visual recognition determines the contents of an image to create classifiers which identify objects, events, and settings. This analysis is combined with existing metadata associated with a photograph (such as information stored in EXIF metadata as social tagging) and stored in a repository. This metadata includes fields such as: date of capture; location of capture; identified people; identified facial expressions; and identified objects. The repository can also include previously analyzed images with associated metadata and tags describing the content of these images.

Depending on the implementation of image analytics, the image from the cameras 103a-103n is used as input to obtain the user and object identity via image analytics. Once the user is identified, predefined mapping of user priority is used to determine which user receives priority in manipulating the 3D holographic object if more than one user seeks to manipulate the 3D holographic object in way that only one user can do so at a time. It should be noted that there may be objects that more than one user can interact with simultaneously. Software will continue to identify the duration of any user's interaction, during that time no other user can interact with the holographic object. It should be noted that each user identified can be assigned a color or other such designation by the system to identify that the user has selected and is currently manipulating the 3D holographic object.

Objects in the ecosystem are identified. When the 3D holographic object is projected, the object can be made known to the ecosystem. The 3D holographic object can be presented in way that its identity is known to the users either visually, through annotation, audible, haptic feedback, or other feedback. For example, the 3D holographic object may have specific properties and rules for interaction such as 2 or 4 sides of square object can be interacted with simultaneously, however if a user chooses to rotate the square object, other user manipulations are blocked.

The image analytics may also be present on the mobile device computer, a server computer, or cloud based, such as a social network.

Next, the system identifies user interaction with the 3D holographic objects (step 304).

The system identifies a user interaction with the 3D holographic object by detecting whether a user points their finger 208 towards the required holographic object 205a-205c. The system then uses image analysis techniques to extrapolate the finger direction of the users to identify the 3D holographic objects intended to be selected. The specific user initiating the interaction is also identified. Cameras 103a-103n and other sensors installed in holographic projection ecosystem 100 capture interaction behaviors of participating users from various angles to identify if a user is using finger to control any 3D holographic objects. It should be noted that identification of the user pointing their finger towards the required 3D holographic object initiates the request to interact with one or more holographic objects. For example, in FIG. 3, both user U1 and U3 are selecting the 3D holographic object of a bunny 205a and user U2 has selected the 3D holographic object of a cube 205c.

The system evaluates the identification of the users and 3D holographic objects policy for user interactions with the 3D holographic objects selected to generate a queue of interaction requested by multiple users (step 306).

To determine the user for priority evaluation and the corresponding object policy, the system reads the object selected definition of the interaction policy.

If the object can only be interacted with or manipulated by one user at time and checked for a given operation (e.g. rotate or move object), the user priority information is retrieved. For example, manager (user U1)=priority 1, team lead=priority=2, other team members first come first served. Then the identified user initiating the request is reviewed for priority. User requests are queued accordingly during interaction by the user with priority with the object. In other words, a queue is generated, which includes interactions requested by the multiple users during interactions that can only be manipulated by a single user at a time.

If the object can be interacted with or manipulated by more than one user (e.g. touching a button on a side of a multi-sided object), user priority information is retrieved. For example, manager (user U1)=priority 1, team lead=priority=2, other team members first come first served. Depending on the number of sides of the object or controls allowed to be interacted with at same time, the users will be allowed to do so in the priority order defined. User requests are then queued accordingly.

Therefore, the basic hierarchy for manipulation of an object by multiple users is: 1) user priority; 2) if the interaction task allows for other users on other side of object to interact, allow a next person in the queue to interact with the object; 3) evaluate user control policy to determine whether some actions may not be permitted for given user; and 4) if the current priority user engages in activity that does not allow for other users to have proper control such as rotation, then continue to queue the request until the priority user interaction is complete.

Referring to FIG. 3, U1 would be able to rotate the 3D holographic object prior to user U3. User U3 would be able to manipulate the 3D holographic object after U1 has manipulated the object. The user manipulating the object is indicated by a solid colored line or pulsing line between the user and the object.

The commands received from the user with the highest priority of the multiple users are executed and the 3D holographic image is manipulated (step 308).

For example, a 3D holographic object is selected through pointing at the 3D holographic object. From the extrapolated finger direction of the user for the identified 3D holographic object selected, the holographic projection ecosystem 100 plots a holographic intersection line 206 from the fingertip 208 to the 3D holographic object. Software controls projection of the line from user to the 3D holographic object to visualize what the user is attempting to select. This allows the user to move the finger accordingly until the desired 3D holographic object is selected. The selection could be configured to occur based on time parameter of pointing at an object (ie. 3 or 5 seconds). The line from the user to the 3D holographic object (single user access) or side of the 3D holographic object (multi user access) will change color to that of user mapping. Each user has a defined color mapping such that when they select or manipulate the 3D holographic object, the line from the user to the 3D holographic object is represented as active by showing the color for that user. The line could be configured to pulse or stay solid. The duration to manipulate the 3D holographic object is started from the time the object has been selected.

Other interactions can include, but are not limited to, touch of the object, rotation of the object, and movement of the 3D holographic object.

The touch of the 3D holographic object can be initiated through selection of tab/page, button, selection control. After selection of the 3D holographic object is determined, there may be specific pages, buttons or controls the user seeks to touch. The gesture of touch is evaluated by the line project of the user to the intersection point on the 3D holographic object itself to perform the touch, or press of button or control.

The rotation of the 3D holographic object can be initiated by multi sided controls on the 3D holographic object. After selection of the 3D holographic object is determined, the user can perform gesture turning hand to initiate software performing a rotation of the 3D holographic object.

The movement of the 3D holographic object can be initiated by directional movement of the 3D holographic object within the define boundaries of the hologram ecosystem.

If the system receives an indication that the user is no longer controlling or manipulating the 3D holographic object (step 310), the system processes queued interaction requests and associated commands from another user of the multiple users with the next highest priority (step 312). A notification may be sent to the next user of the queue. For example, a line is illuminated between the 3D holographic object and the next user.

If more users are present (step 314), the method returns to step 310 of determining whether the current user has completed the manipulation of the 3D holographic object.

If no more users are present in the queue (step 314), the method ends.

If the user has not completed their manipulation of the 3D holographic object (step 310), the method returns to step 308 of executing received commands regarding manipulation of the 3D holographic object.

The system then processes queued interaction requests from the user regarding the 3D holographic object (step 310) and the method ends.

Once the user has finished interaction or duration of manipulation times out, the other users in the queue will be notified in priority order with a holographic line towards the user. The next queued user line and color will signal that user has control. Accordingly other users can take the control of the holographic object navigation and interaction. In this case, the holographic object interaction means, rotating, changing direction, dimension, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of selecting a user from a plurality of users simultaneously attempting to control a 3D projected holographic object of a plurality of 3D holographic objects projected in midair above a central point of a location by a projector, the location further comprising a plurality of cameras around the central point of the location, the method comprising the steps of:
   a computer identifying a plurality of users situated around the central point and the 3D projected holographic object;
   the computer identifying a plurality of simultaneous user interactions of at least one finger of a hand of each user of the plurality of users with the 3D projected holographic object;
   the computer evaluating identification of the identified plurality of users which executed simultaneous user interactions with the 3D projected holographic object and a policy regarding manipulation of the 3D projected holographic object selected simultaneously by more than one user of the plurality of users;
   the computer, for the 3D holographic object selected simultaneously by the identified plurality of users, generating a queue of interactions requested by the identified plurality of users during interactions of a single user of the plurality of users with the 3D projected holographic object, wherein the queue is generated according to a determination of a ranking of administrative priority of a first user as having a designated first administrative priority over the plurality of users, a second user as having a designated second administrative priority over a plurality of remaining users, and the plurality of remaining users as having equal priority, but less administrative priority than the first user and the second user in the queue and whereby manipulation of the 3D projected holographic image during the interactions of the single user can only be executed by the single user at a time based on the ranking of administrative priority; and
   the computer executing the interactions requested by the single user of the plurality of users with a highest administrative priority of the identified plurality of users executing simultaneous user interactions with the 3D projected holographic object, wherein the highest administrative priority is further based on a first come first served time of selection of the 3D projected holographic object by the single user of the plurality of users.

2. The method of claim 1, wherein the 3D projected holographic objects which are selected simultaneously by the plurality of users are identified by the steps of: the computer extrapolating finger direction of a tip of the at least one finger of the hand of each user of the plurality of users for the 3D projected holographic object selected from images captured by the plurality of cameras and plotting a holographic intersection line from the tip of the finger of the hand of each user of the identified plurality of users to the 3D projected holographic object.

3. The method of claim 1, wherein the 3D projected holographic object selected is highlighted in a color associated with the user of the plurality of users interacting with the 3D projected holographic object.

4. The method of claim 1, wherein the plurality of users are identified using image analysis based on images captured by the plurality of cameras.

5. A computer program product for selecting a user from a plurality of users simultaneously attempting to control a 3D projected holographic object of a plurality of 3D holographic objects projected in midair above a central point of a location by a projector, the location further comprising a plurality of cameras around the central point of the location, a computer within the location and in communication with the projector comprising at least one processor, one or more memories, one or more computer readable storage media, the computer program product comprising a computer readable storage medium having program instructions embodied therewith, the program instructions executable by the computer to perform a method comprising:
 identifying, by the computer, a plurality of users situated around the central point and the 3D projected holographic object;
 identifying, by the computer, a plurality of simultaneous user interactions of at least one finger of a hand of the identified plurality of users with the 3D projected holographic object;
 evaluating, by the computer, identification of the identified plurality of users which executed simultaneous user interactions with the 3D projected holographic object and a policy regarding manipulation of the 3D projected holographic object selected simultaneously by more than one user of the plurality of users;
 for the 3D holographic object selected simultaneously by the identified plurality of users, generating, by the computer, a queue of interactions requested by the identified plurality of users during interactions of a single user of the plurality of users with the 3D projected holographic object, wherein the queue is generated according to a determination of a ranking of administrative priority of a first user as having a designated first administrative priority over the plurality of users, a second user as having a designated second administrative priority over a plurality of remaining users, and the plurality of remaining users as having equal priority, but less administrative priority than the first user and the second user in the queue and whereby manipulation of the 3D projected holographic image during the interactions of the single user can only be executed by the single user at a time based on the ranking of administrative priority; and
 executing, by the computer, the interactions requested by the single user of the plurality of users with a highest administrative priority of the identified plurality of users executing simultaneous user interactions with the 3D projected holographic object, wherein the highest administrative priority is further based on a first come first served time of selection of the 3D projected holographic object by the single user of the plurality of users.

6. The computer program product of claim 5, wherein the 3D projected holographic objects which are selected simultaneously by the plurality of users are identified by the program instructions of: extrapolating, by the computer, finger direction of a tip of the at least one finger of the hand of the identified plurality of users for the 3D projected holographic object selected from images captured by the plurality of cameras and plotting, by the computer, a holographic intersection line from the tip of the finger of the hand of the identified plurality of users to the 3D projected holographic object.

7. The computer program product of claim 5, wherein the 3D projected holographic object selected is highlighted in a color associated with the user of the plurality of users interacting with the 3D projected holographic object.

8. The computer program product of claim 5, wherein the plurality of users are identified using image analysis based on images captured by the plurality of cameras.

9. The computer program product of claim 5, wherein the computer is part of the projector.

10. A computer system for selecting a user from a plurality of users simultaneously attempting to control a 3D projected holographic object of a plurality of 3D holographic objects projected in midair above a central point of a location by a projector, the location further comprising a plurality of cameras around the central point of the location, a computer within the location and in communication with the projector comprising at least one processor, one or more memories, one or more computer readable storage media having program instructions executable by the computer to perform the program instructions comprising:
 identifying, by the computer, a plurality of users situated around the central point and the 3D projected holographic object;
 identifying, by the computer, a plurality of simultaneous user interactions of at least one finger of a hand of the identified plurality of users with the 3D projected holographic object;
 evaluating, by the computer, identification of the identified plurality of users which executed simultaneous user interactions with the 3D projected holographic object and a policy regarding manipulation of the 3D projected holographic object selected simultaneously by more than one user of the plurality of users;
 for the 3D holographic object selected simultaneously by the identified plurality of users, generating, by the computer, a queue of interactions requested by the identified plurality of users during interactions of a single user of the plurality of users with the 3D projected holographic object, wherein the queue is generated according to a determination of a ranking of administrative priority of a first user as having a designated first administrative priority over the plurality of users, a second user as having a designated second administrative priority over a plurality of remaining users, and the plurality of remaining users as having equal priority, but less administrative priority than the first user and the second user in the queue and whereby manipulation of the 3D projected holographic image during the interactions of the single user can only be executed by the single user at a time based on the ranking of administrative priority; and
 executing, by the computer, the interactions requested by the single user of the plurality of users with a highest administrative priority of the identified plurality of users executing simultaneous user interactions with the 3D projected holographic object, wherein the highest administrative priority is further based on a first come first served time of selection of the 3D projected holographic object by the single user of the plurality of users.

11. The computer system of claim 10, wherein the 3D projected holographic objects which are selected simultaneously by the plurality of users are identified by the program instructions of: extrapolating, by the computer, finger direction of a tip of the at least one finger of the hand of the identified plurality of users for the 3D projected holographic object selected from images captured by the plurality of cameras and plotting, by the computer, a holographic intersection line from the tip of the finger of the hand of the identified plurality of users to the 3D projected holographic object.

* * * * *